(12) United States Patent
Matsushita et al.

(10) Patent No.: US 12,307,324 B2
(45) Date of Patent: May 20, 2025

(54) VEHICLE

(71) Applicant: TOYOTA JIDOSHA KABUSHIKI KAISHA, Toyota (JP)

(72) Inventors: Makoto Matsushita, Ichinomiya (JP); Yuko Mizuno, Nagoya (JP); Hayato Mizuma, Tokyo (JP); Kohei Miwa, Shizuoka-ken (JP); Naoki Yamada, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/636,390

(22) Filed: Apr. 16, 2024

(65) Prior Publication Data
US 2024/0412016 A1    Dec. 12, 2024

(30) Foreign Application Priority Data

Jun. 6, 2023    (JP) .................................. 2023-093065

(51) Int. Cl.
*G06K 7/14*    (2006.01)

(52) U.S. Cl.
CPC .................................. *G06K 7/1417* (2013.01)

(58) Field of Classification Search
CPC .. G06K 7/1404; G06K 7/1408; G06K 7/1413; G06K 7/1417; G08G 1/096716; B60Q 1/302; B60Q 1/40; B60Q 1/503; B60Q 1/5035
See application file for complete search history.

(56) References Cited

U.S. PATENT DOCUMENTS

| | | | |
|---|---|---|---|
| 2014/0247160 A1* | 9/2014 | Glascock | G08G 1/095 340/907 |
| 2020/0269847 A1 | 8/2020 | Hamagami et al. | |
| 2020/0374674 A1* | 11/2020 | Karaaslan, Jr. | G01S 19/01 |

FOREIGN PATENT DOCUMENTS

| | | | |
|---|---|---|---|
| JP | 2009251933 A | * | 10/2009 |
| JP | 2020-140237 A | | 9/2020 |
| WO | WO-2017103920 A1 | * | 6/2017 |

* cited by examiner

*Primary Examiner* — Laura A Gudorf
(74) *Attorney, Agent, or Firm* — Sughrue Mion, PLLC

(57) ABSTRACT

The vehicle includes a drive recorder that captures an image of the front of the vehicle, an external display device that performs display toward the rear of the vehicle, and a control unit. When a specific pattern is included in the video captured by the drive recorder, the control unit causes the external display device to display the same pattern as the pattern.

3 Claims, 2 Drawing Sheets

VEHICLE

CROSS-REFERENCE TO RELATED APPLICATION

This application claims priority to Japanese Patent Application No. 2023-093065 filed on Jun. 6, 2023 incorporated herein by reference in its entirety.

BACKGROUND

1. Technical Field

The present disclosure relates to a vehicle.

2. Description of Related Art

Japanese Unexamined Patent Application Publication No. 2020-140237 (JP 2020-140237 A) describes a vehicle that distributes, to a succeeding vehicle, information such as an image of a traffic accident site captured by an external camera. The vehicle described in this document distributes information to a succeeding vehicle through vehicle-to-vehicle communication using radio waves and a traffic information distribution network.

SUMMARY

A practical method has not yet been proposed as a method for distributing information to vehicles other than those using radio waves as a carrier medium for such information.

A vehicle that solves the above problem includes:
a drive recorder configured to capture an image of an area ahead of the vehicle;
an external display device configured to display an indication for an area behind the vehicle; and
a control unit configured to, when a specific pattern is included in the image captured by the drive recorder, cause the external display device to display the same pattern as the pattern.

The above vehicle realizes information distribution to a succeeding vehicle that does not use radio waves as the carrier medium for information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Vehicle

Figure 1:
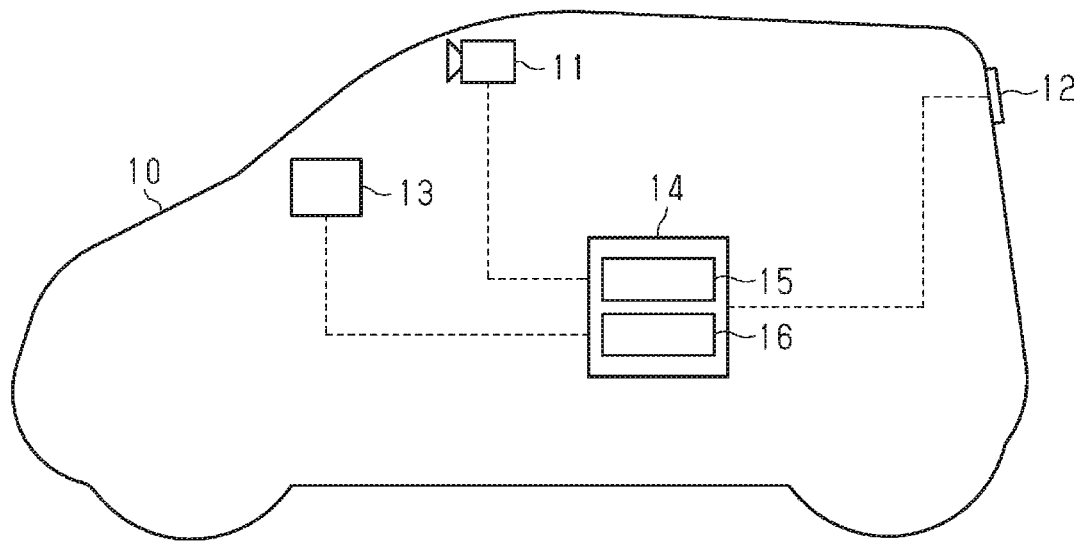
FIG. 1 is a diagram schematically illustrating a configuration of an embodiment of a vehicle.

Hereinafter, an embodiment of a vehicle will be described in detail with reference to FIGS. 1 to 3. First, the configuration of the vehicle 10 of the present embodiment will be described with reference to FIG. 1. The vehicle 10 includes a drive recorder 11, an external display device 12, a human-machine interface (HMI) 13, and control unit 14). The drive recorder 11, the external display device 12, HMI 13, and the control unit 14 are communicably connected to each other through an in-vehicle network. The drive recorder 11 includes a camera that captures an image in front of the vehicle 10. The external display device 12 is a device that performs display toward the rear of the vehicle 10. Examples of the external display device 12 include a planar display using a liquid crystal panel or an organic EL panel, and an electric bulletin board in which light emitters are arranged in a grid pattern. HMI 13 is an input/output device that connects the vehicles 10 and the occupant. Exemplary HMI 13 include touch screens. The control unit 14 comprises a processor 15 and a memory 16. The control unit 14 controls the drive recorder 11, the external display device 12, and HMI 13 by the processor 15 executing a program stored in the memory 16. Inter-vehicle communication The vehicle 10 is configured to perform inter-vehicle communication using the drive recorder 11 and the external display device 12. Hereinafter, the vehicle-to-vehicle communication will be described in detail with reference to FIGS. 2 and 3.

Figure 2:
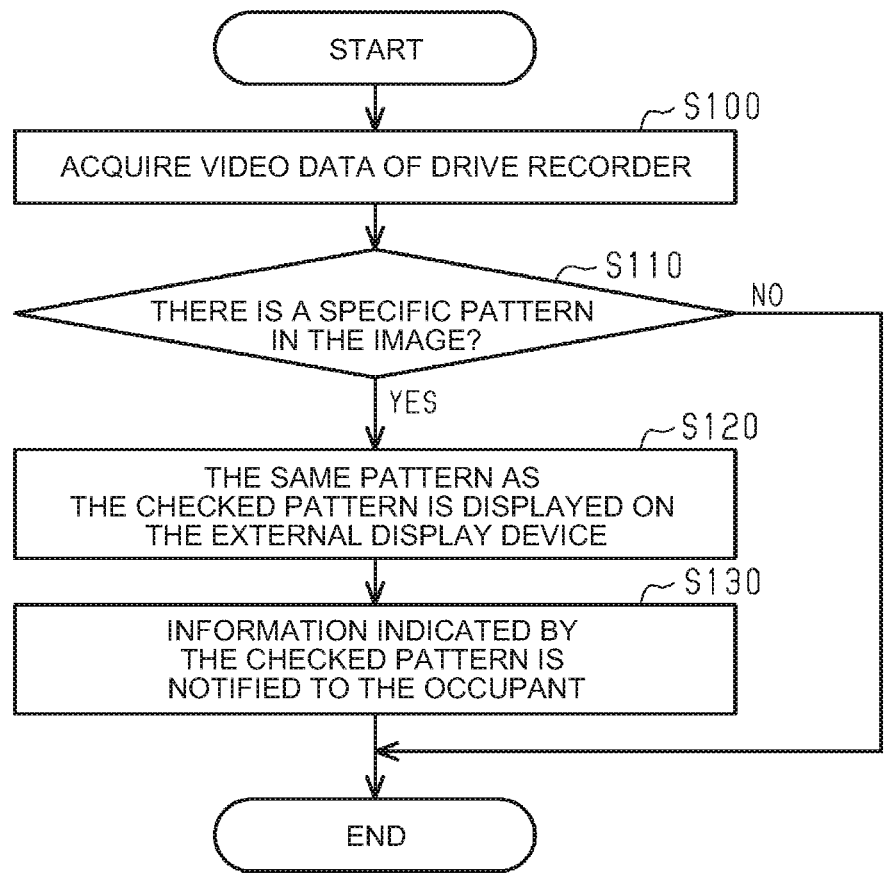
FIG. 2 is a flow chart of a process executed by a control unit of the vehicle.

FIG. 2 shows a flow of processing executed by the control unit 14 for inter-vehicle communication. The control unit 14 repeatedly executes the processing of FIG. 2 at every predetermined control cycle during the traveling of the vehicle 10. When the process of FIG. 2 is started, the control unit 14 first acquires the video data of the drive recorder 11 in S100. In a subsequent S110, the control unit 14 analyzes the acquired video data to determine whether a particular pattern is included in the video. Then, the control unit 14 advances the processing to S120 when a particular pattern is included in the video (YES), and ends the processing in the current control cycle when the pattern is not included (NO). Certain patterns have geometries and colors that can be detected by pattern matching. Further, the specific pattern includes a portion indicating the content of the information to be distributed. Examples of specific patterns include two-dimensional codes.

In S120, the control unit 14 causes the external display device 12 to display the same pattern as the particular pattern confirmed in the video. In the following S130, the control unit 14 notifies the occupant of the information indicated by the checked pattern through HMI 13. The notification of the information to the occupant is performed by displaying a character or an image, outputting sound, or the like.

Operation and Effect of Embodiments

When the control unit 14 of the vehicle 10 confirms that a specific pattern is included in the video captured by the drive recorder 11, the control unit displays the same pattern as the pattern on the external display device 12. Further, the control unit 14 notifies the occupant of the information read from the checked pattern. In the vehicle 10 of the present embodiment, the control unit 14 corresponds to a control unit.

Figure 3:
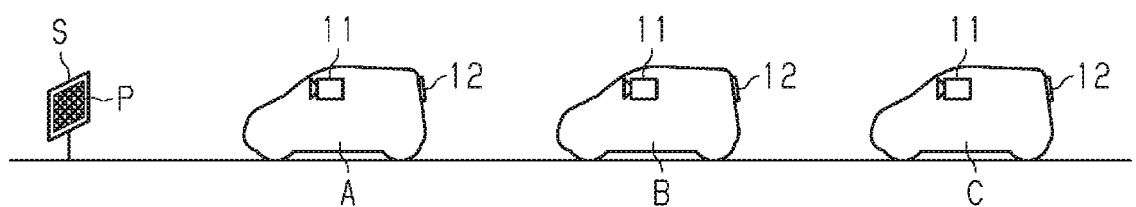
FIG. 3 is a diagram illustrating a mode of transmitting information to a subsequent vehicle in the vehicle.

FIG. 3 shows a road sign S installed on a road and three vehicles A to C traveling along the road side by side in front and rear directions. The configurations of the three vehicles A to C are the same as those of the vehicle 10 in FIG. 1. A specific pattern P is displayed on the road sign S.

When the pattern P displayed on the road sign S is captured by the drive recorder 11 of the vehicle A running at the head, the same pattern as the pattern P is displayed on the external display device 12 of the vehicle A. The pattern displayed on the external display device 12 of the vehicle A is captured by the drive recorder 11 of the vehicle B running behind. The vehicle B displays the same pattern as that displayed on the external display device 12 of the vehicle A on its own external display device 12. The pattern displayed on the external display device 12 of the vehicle B is captured by the drive recorder 11 of the vehicle C running behind. In each of the vehicles A to C, information read from the pattern captured by the drive recorder 11 is notified to the occupant. In this way, the information acquired by the vehicle A from the road sign S is sequentially distributed to subsequent vehicles.

Examples of the specific pattern P to be displayed on the road sign S include a pattern indicating information on construction traffic restriction. The information on the construction traffic restriction includes information on the position of the restriction section such as the start position and the end position of the construction traffic restriction, and information on the type of the traffic restriction such as the gradual travel and the one-side alternating travel. In such a case, it is possible to distribute the information of the restriction to the vehicle heading to the place where the construction traffic restriction is performed.

The section and type of the construction traffic restriction may change according to the progress of the construction. In the case of the vehicle 10, it is possible to change the information of the construction traffic restriction to be distributed by changing the installation location of the road sign S and the pattern displayed on the road sign S by the worker at the construction site. That is, the contents of the information of the construction traffic restriction to be distributed can be changed at the site of the construction. Therefore, it is possible to enhance the immediacy of the information of the construction traffic restriction to be distributed. If an electronic signboard is used as the road sign S, the pattern to be displayed can be easily changed.

According to the vehicle 10 of the present embodiment described above, the following effects can be obtained.

(1) The vehicle 10 of the present embodiment includes a drive recorder 11 that captures an image of the front of the vehicle, and an external display device 12 that performs display toward the rear of the vehicle. In addition, the vehicle 10 includes a control unit 14 that, when a specific pattern is included in the video captured by the drive recorder 11, displays the same pattern as the pattern on the external display device 12. Such a vehicle 10 transmits information to the following vehicle 10 by displaying a pattern displayed on the external display device 12 of the preceding vehicle 10 on its own external display device 12. Therefore, the vehicle 10 of the present embodiment has an effect of realizing information distribution to the following vehicle.

(2) The control unit 14 in the vehicle 10 of the present embodiment reads information indicated by the pattern in the video captured by the drive recorder 11 and notifies the occupant of the information. Therefore, as a pattern used for information transmission, a pattern other than a pattern that can be directly read by an occupant such as a character or a pictogram can be used. As a result, the amount of information that can be distributed can be increased. In addition, it is possible to notify the occupant of the information even if the occupant does not directly recognize the specific pattern.

(3) By using the two-dimensional code as the specific pattern, it is easy for the control unit 14 to identify the specific pattern in the video. Further, more information can be distributed than when information is transmitted using characters or pictograms.

The present embodiment can be modified as follows. The present embodiment and the following modifications can be implemented in combination with each other as long as they are not technically contradictory. Information other than construction traffic regulations, such as traffic accidents, traffic congestion, advertisements such as stores, tourist guidance, and the like, may be distributed using a specific pattern.

Instead of the road sign S, information may be distributed starting from the vehicle 10. For example, when the vehicle 10 is stopped on the road shoulder due to a failure, a pattern indicating information such as "presence of a failed vehicle in front" is displayed on the external display device 12. In such cases, the control unit 14 may be configured to cause the external display device 12 to display a particular pattern in response to an operation of the occupant on HMI 13 or the like.

A character or a pictogram that can be directly recognized by a person may be included in a specific pattern to be displayed on the external display device 12 or the road sign S. In this case, the occupant of the vehicle 10 can confirm the information by visually recognizing the pattern displayed on the external display device 12 or the road sign S of the preceding vehicle. Therefore, in such cases, the control unit 14 can be configured to execute the processing of FIG. 2 in a form in which the processing of S130 is omitted.

Information that is used only for controlling the vehicle 10 and that does not require notification to the occupant may be distributed using a specific pattern. Also in this case, the control unit 14 can be configured to execute the processing of FIG. 2 in a form in which the processing of S130 is omitted.

What is claimed is:

1. A vehicle comprising:
   a drive recorder configured to capture an image of an area ahead of the vehicle;
   an external display device configured to display an indication for an area behind the vehicle; and
   a control unit configured to:
   acquire the image captured by the drive recorder,
   when a specific pattern is included in the image captured by the drive recorder, read information indicated by the specific pattern, wherein the specific pattern is a two-dimensional code;
   notify an occupant inside the vehicle about the information, wherein the information indicated by the specific pattern is information of a construction traffic restriction;
   after the occupant is notified inside the vehicle about the information of the construction traffic restriction, cause the external display device to display the specific pattern in response to an operation of the occupant;
   based upon the image captured by the drive recorder including an electronic signboard displaying a road sign, determine whether the road sign is being changed on the electronic signboard; and
   cause the external display device to display a changed road sign as the information on the construction traffic restriction.

2. The vehicle according to claim 1, wherein the information on the construction traffic restriction includes a start position and an end position of a restriction section, and at least one of a gradual travel and a one-side alternating travel.

3. A vehicle comprising:
   a drive recorder configured to capture an image of an area ahead of the vehicle;

an external display device configured to display an indication for an area behind the vehicle; and
a control unit configured to:
read information indicated by a pattern in the image captured by the drive recorder;
when the pattern in the image is a specific pattern, notify an occupant about the information;
control the external display device to display the same pattern as the specific pattern in response to an operation of the occupant after the occupant is notified about the information; and
control the external display device to display control information that is used only for controlling the vehicle, wherein the control information is not notified to the occupant inside the vehicle.

* * * * *